US008630629B2

(12) United States Patent
Hawkins

(10) Patent No.: US 8,630,629 B2
(45) Date of Patent: *Jan. 14, 2014

(54) SYSTEM AND METHOD FOR DELIVERING ADVERTISING TO PACKET-BASED TELEPHONES

(75) Inventor: Johnny D. Hawkins, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,037

(22) Filed: Jun. 6, 2012

(65) Prior Publication Data

US 2012/0243672 A1 Sep. 27, 2012

Related U.S. Application Data

(63) Continuation of application No. 12/146,958, filed on Jun. 26, 2008, now Pat. No. 8,219,070.

(51) Int. Cl.
*H04M 3/42* (2006.01)
*G06Q 30/00* (2012.01)
*H04W 4/02* (2009.01)

(52) U.S. Cl.
USPC ............. 455/414.1; 379/207.12; 705/14.49

(58) Field of Classification Search
USPC .............. 455/404.1, 404.2, 414.1–414.4, 455/456.1–457
See application file for complete search history.

(56) References Cited

U.S. PATENT DOCUMENTS

| 5,588,048 | A | * | 12/1996 | Neville | 379/127.01 |
|---|---|---|---|---|---|
| 8,219,070 | B2 | | 7/2012 | Hawkins | |
| 2007/0100801 | A1 | | 5/2007 | Celik et al. | |
| 2007/0116227 | A1 | * | 5/2007 | Vitenson et al. | 379/207.02 |
| 2008/0120176 | A1 | * | 5/2008 | Batni et al. | 705/14 |
| 2008/0243619 | A1 | * | 10/2008 | Sharman et al. | 705/14 |
| 2009/0325545 | A1 | | 12/2009 | Hawkins | |

OTHER PUBLICATIONS

U.S. Appl. No. 12/146,958 Notice of Allowance dated Mar. 6, 2012; 7 pages.
U.S. Appl. No. 12/146,958; Issue Notification dated Jun. 21, 2012; 1 page.
U.S. Appl. No. 12/146,958; Final Office Action dated Nov. 15, 2011; 18 pages.
U.S. Appl. No. 12/146,958; Non-Final Rejection dated Jul. 1, 2011; 8 pages.

* cited by examiner

*Primary Examiner* — Jinsong Hu
*Assistant Examiner* — Erica Navar
(74) *Attorney, Agent, or Firm* — Swanson & Bratschun, L.L.C.

(57) ABSTRACT

A system and method of delivering targeted advertising to packet-based network telecommunications devices may include accessing a database configured to store telephone services information of telecommunications devices. The telecommunications services information may indicate whether a telecommunications device has packet-based network access. Telecommunications devices that have telephone number information including NPA-NXX of a certain NPA-NXX code and packet-based network access may be identified. Advertising content may be communicated to the identified telecommunications devices for display on the telecommunications device.

16 Claims, 10 Drawing Sheets

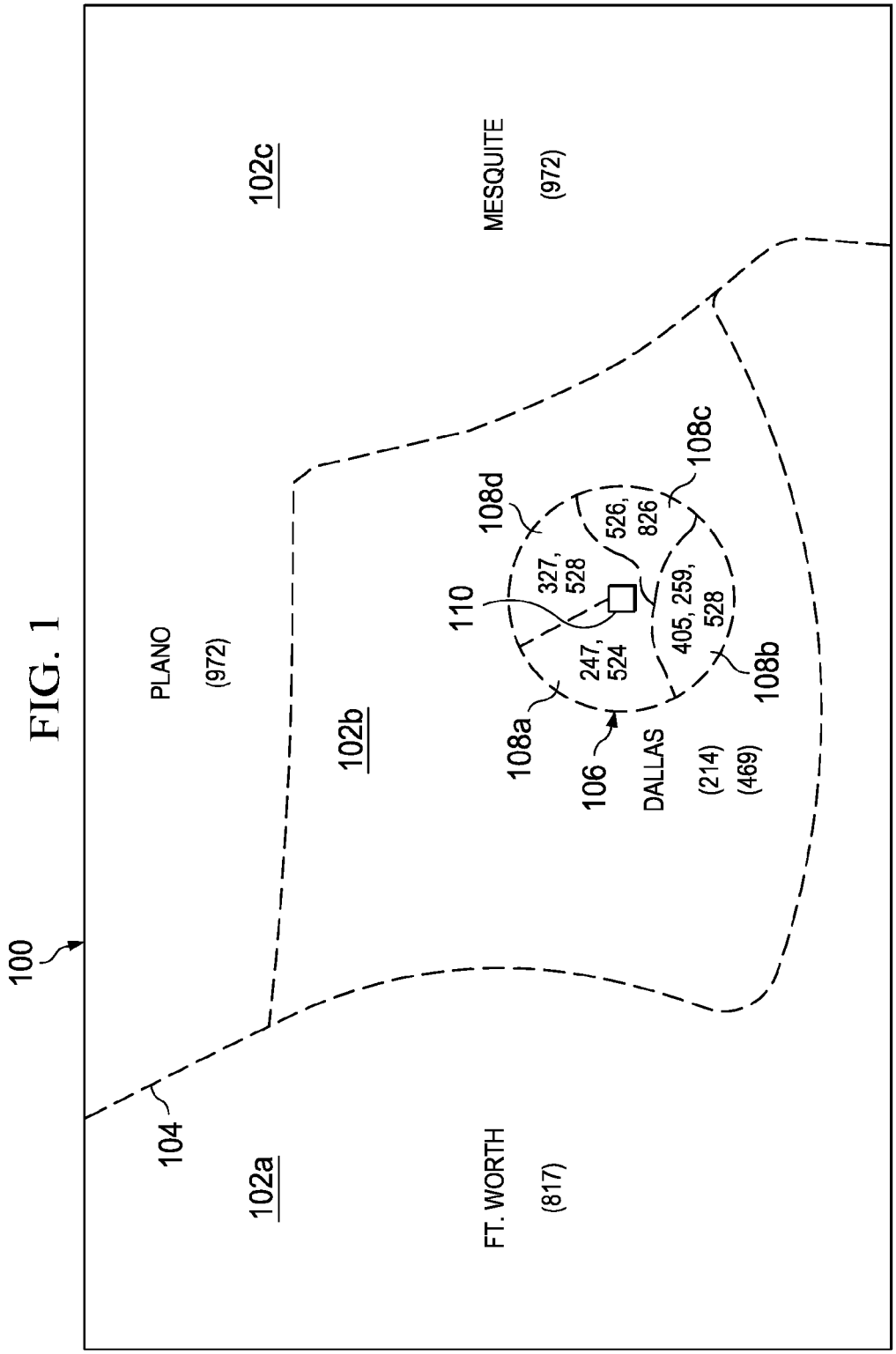

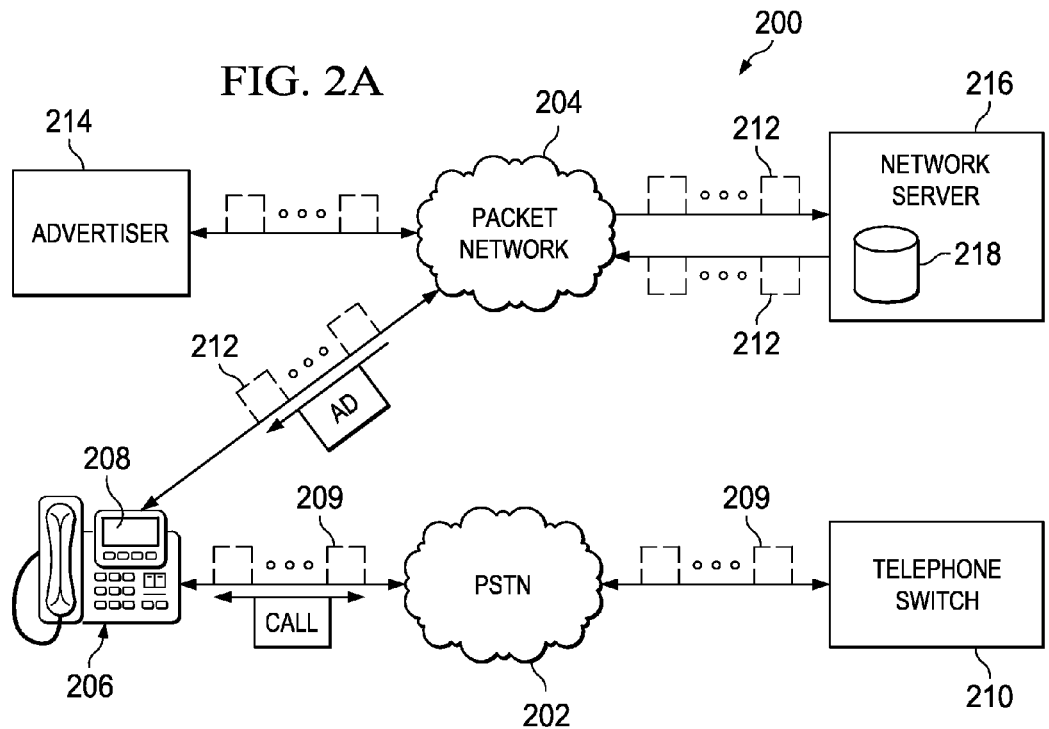
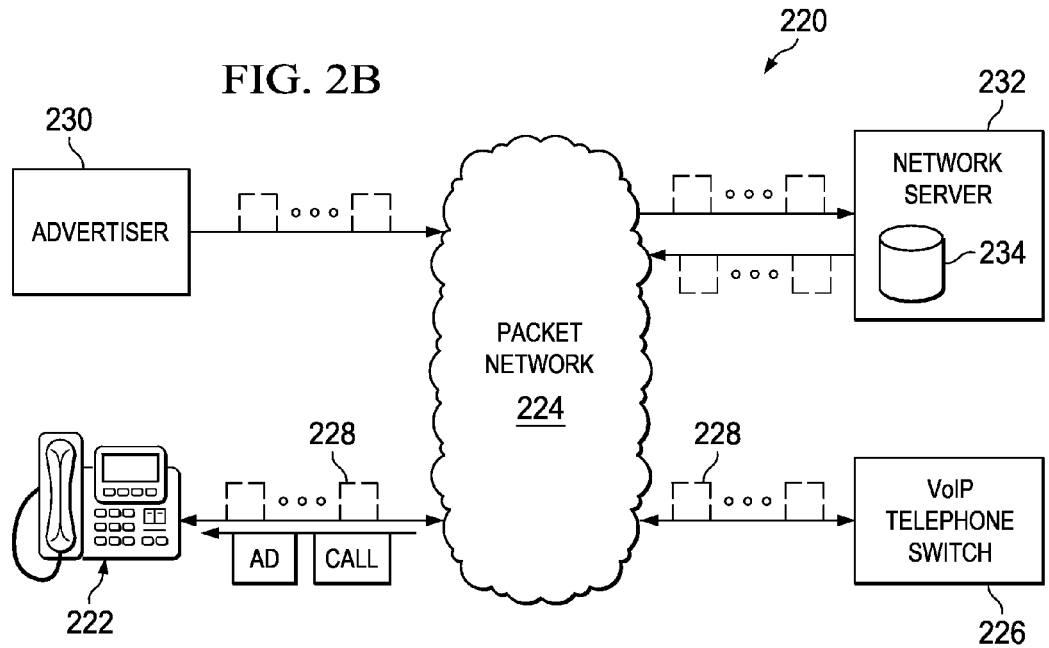

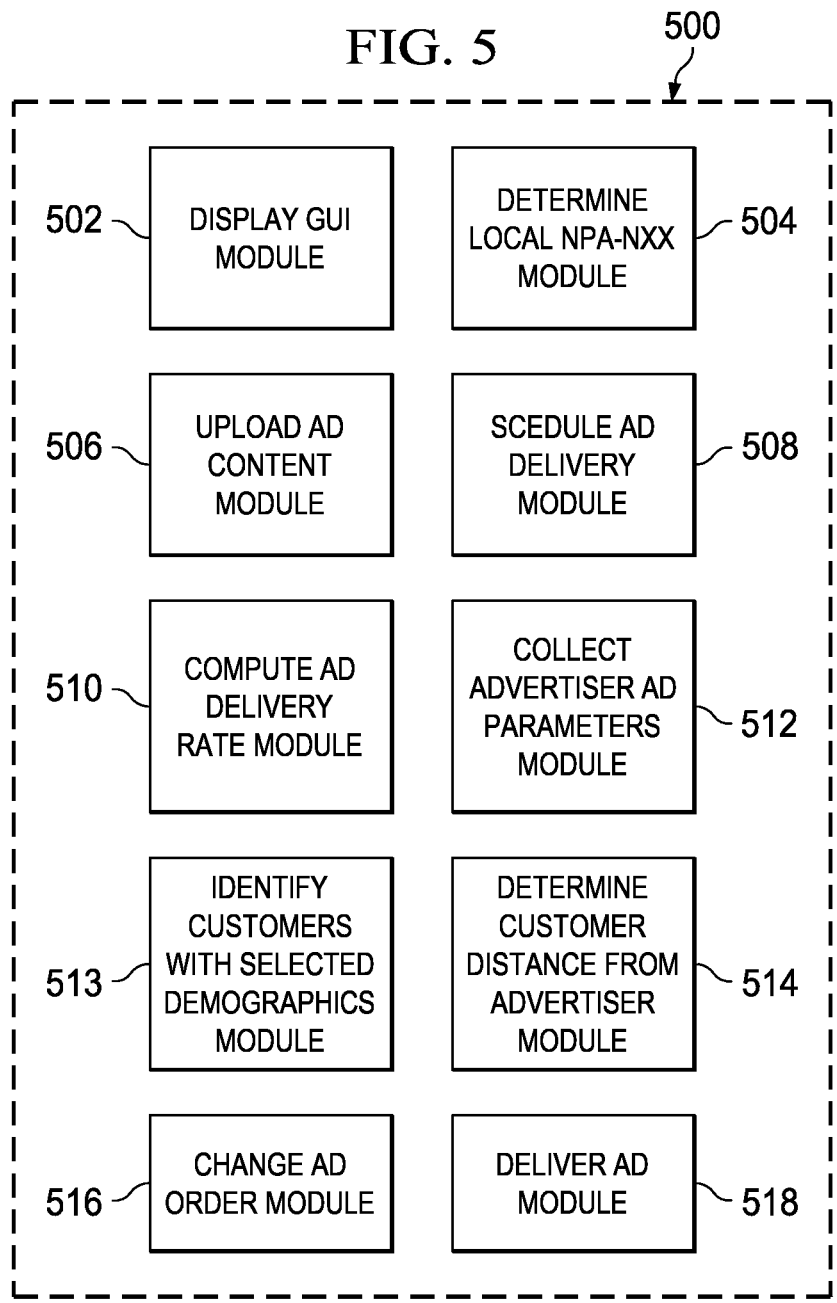

FIG. 7

PLAYLIST 700

| | DATES | DAYS | HOURS | AD CONTENT | TYPE | LENGTH | SIZE | POSITION | ON-HOOK | OFF-HOOK | PLAYED |
|---|---|---|---|---|---|---|---|---|---|---|---|
| 702a → | 7/14/08 - 8/14/08 | ALL | 8:00AM - 4:30PM | CHEVYCAR.MPEG | VIDEO | 185 | 2"x3" | CENTER | NO | YES | 2.5 |
| | 7/14/08 - 8/14/08 | M-F | 12:00PM - 7:00PM | JOES.JPG | PHOTO | 65 | 3"x2" | TOP | YES | YES | 32 |
| | 7/14/08 - 7/18/08 | F-SU | 7:00AM - 12:00PM | WATER.JPG | PHOTO | 55 | 4"x6" | FULL | YES | NO | 48 |
| 702n → | ... | ... | ... | ... | ... | ... | ... | ... | ... | ... | ... |

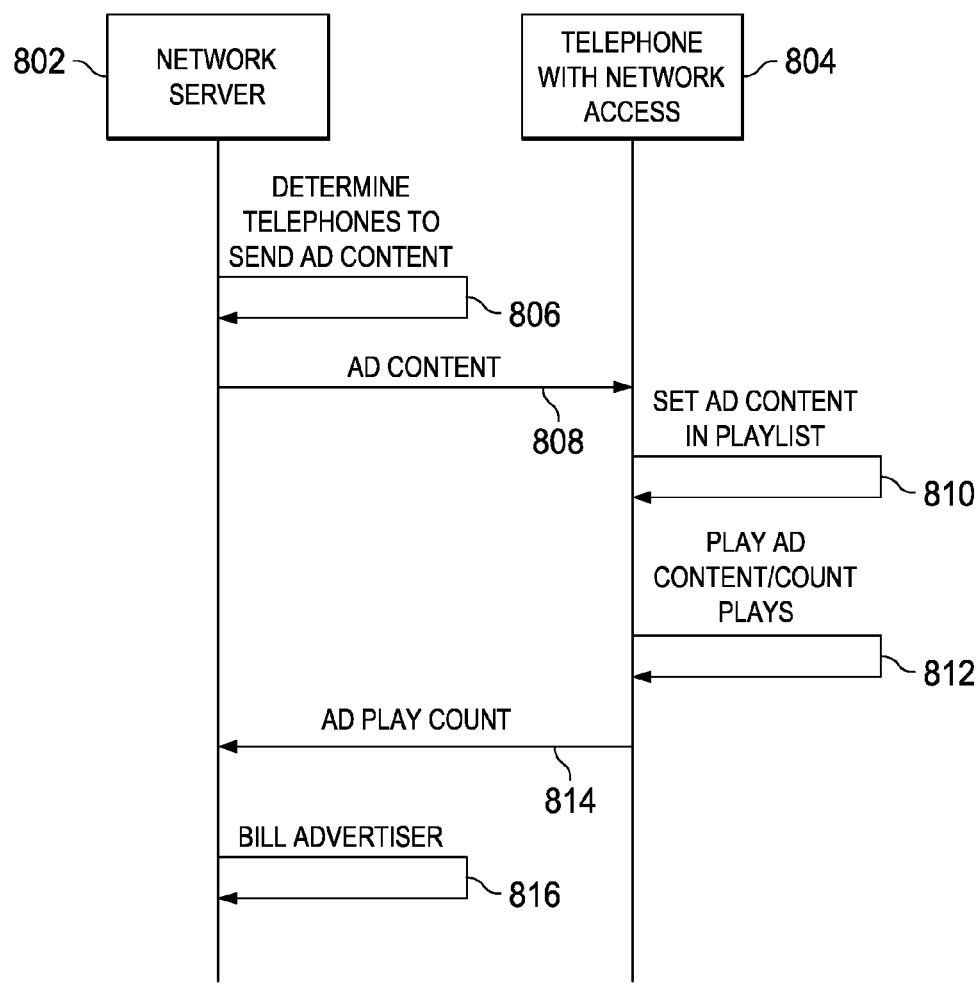

SYSTEM AND METHOD FOR DELIVERING ADVERTISING TO PACKET-BASED TELEPHONES

CROSS-REFERENCE TO RELATED CASES

This application is a continuation of U.S. application Ser. No. 12/146,958, filed Jun. 26, 2008 by Johnny D. Hawkins and entitled, "System and Method for Delivering Advertising to Packet-Based Telephones," the entire disclosure of which is hereby incorporated by reference.

BACKGROUND

Telecommunications have greatly advanced over the years. No longer is a telephone simply a means of voice communications. Today, society views telecommunications as a technology that provides data communications, such as text messaging and e-mail services, and data network (e.g., the Internet) access. There are many other resources that are provided by telecommunications these days as telephones, both home and mobile, have become points of convergence for a variety of technologies and content distribution, where content includes text, video, and audio.

Advertisers of products and services have and will continue to pursue most effectively delivering their advertising messages to desired customers. Targeted advertising using technology has improved over the years, but limitations exist. Internet advertising faces challenges to identify potential customers who reside in locations that benefit advertisers, especially local advertisers. For example, a local advertiser who desires to advertise on the Internet to reach local customers find themselves advertising on a locally based website, on national recognized websites (e.g., Yahoo) that have local sections within the websites, and in search engines that deliver local, geographically based search results from a user performing a search (e.g., pizza Dallas Tex.). Other targeted advertising techniques on the Internet have been used, but as advertisers have found, delivering targeted advertising on the Internet is a significant challenge given that the Internet is a world-wide forum and local searches, for example, do not necessarily deliver the advertisements to potential local customers.

SUMMARY

To provide advertisers with the ability to target potential local customers, the principals of the present invention provide for identifying local potential customers by their telephone numbers (e.g., number plan area code (NPA) and central office or exchange code (NXX)). NPA-NXX generally defines an area in which a user resides. Each telecommunications service provider is assigned central office codes (i.e., NXX numbers), which, after the telecommunications service provider assigns telephone numbers with the NPA-NXX numbers, generally reflect geographical areas in which a telecommunications service provider provides services to customers. In other words, after a telecommunications service provider assigns an NPA-NXX (e.g., 214-405) to customers in a geographical region (e.g., uptown Dallas), those customers become local to businesses in that geographic area. And, if those customers receive telecommunications services that include packet-based network access (e.g., Internet access), advertisers may deliver advertising to users with an NPA-NXX and be reasonably certain that the advertising is reaching an actual local targeted audience.

One embodiment of a system and method of delivering targeted advertising to packet-based network telecommunications devices includes accessing a database configured to store telephone services information of telecommunications devices. The telecommunications services information may indicate whether a telecommunications device has packet-based network access. Telecommunications devices that have telephone number information including NPA-NXX of a certain NPA-NXX code and packet-based network access may be identified. Advertising content may be communicated to the identified telecommunications devices for display on the telecommunications device.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of an illustrative map of a local region;

FIGS. 2A and 2B are block diagrams of illustrative networks configured to provide for targeting of potential local customers in accordance with the principles of the present invention;

FIG. 5 is a block diagram of illustrative modules to provide for advertising capabilities to telephones with packet-based network access;

FIG. 7 is a table of an illustrative playlist stored on a telephone or network node to provide for displaying advertising content on telephones with packet-based network access;

FIG. 8 is a timing diagram of an illustrative process for providing for advertising to telephones with packet-based network access.

DETAILED DESCRIPTION OF THE DRAWINGS

Figure 3:
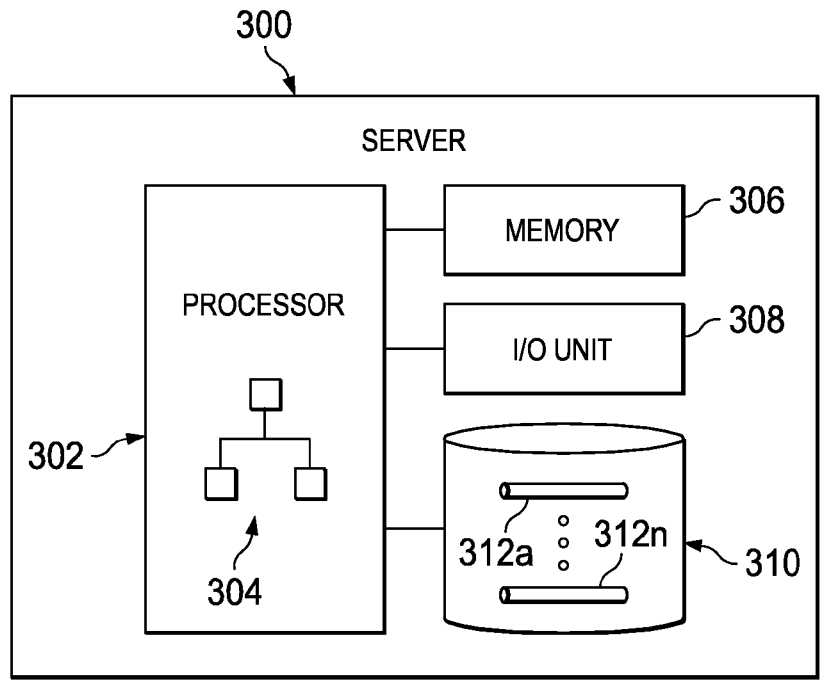
FIG. 3 is a block diagram of an illustrative server configured to provide for advertising to telephones with packet-based network access (e.g., Internet access)

With regarding to FIG. 1, a map 100 depicts a local region in Texas. As shown, the map includes the cities of Dallas, Fort Worth, Mesquite, and Plano. Further shown on the map 100 are area codes that are used within each of the cities. For example, Dallas includes two area codes or NPAs, (214) and (469), Fort Worth includes area code (817), and Mesquite and Plano include area code (972). Dallas includes two area codes due to increased population within the city of Dallas. As is understood in the arts, it has become common practice for the North American Numbering Plan (NANP) organization to expand the number of area codes within increasing population areas to ensure each telecommunications service provider has enough telephone numbers for a local population.

The map 100 is shown with three geographic areas 102a-102c, collectively, (102). These areas 102 are sectioned off by the dash lines 104 to generally identify where each of the area codes are geographically related.

As understood in the art, a central office (not shown) of a telecommunications service provider provides telecommunications services throughout a local region. Each central office is generally assigned with central office codes or exchange codes (i.e., NXX codes), which are the three digits that follow an area code or NPA in a telephone number. As shown on the map 100, a central office serving area 106 is defined by a dashed line of generally circular dimensions. Within the geographic serving area 106 are a number of exchange codes that are assigned to a central office within the geographic serving area 106. As shown, the exchange codes include 247, 259, 405, 524, 526, 528, and 826. Each of the exchange codes are shown to be within regions 108a-108d (collectively 108) of the geographic serving area 106. Each exchange code may be in more than one of the regions 108 depending how the telecommunications service provider distributed the exchange codes to customers. By identifying the exchange codes within the region 108, local advertisers may more clearly specify potential customers with whom advertising is to be directed to capture a targeted audience. As a further example, if an advertiser 110, such as a pizza restaurant, is within the geographic serving area 106, the advertiser 110 may specify that advertisements are to be delivered to potential customers within the NPA-NXX that is within the geographic serving area 106. For example, the advertiser 110 may specify that advertisements are to be communicated to telephones with packet-based network access (e.g., voice-over-Internet Protocol (VoIP) telephones) that have an area code of (214) and/or (469) and any of the exchange codes within the regions 108a and 108d, as the advertiser 110 is within a geographic region that those NPAs also reside. One reason for advertisers to advertise to a local market is that most potential customers for small businesses are within three or so miles from that business. Of course, an advertiser may expand the distance from the business location to advertise. For example, a local advertiser may decide that the products or services of that business may be desirable to potential customers that are beyond a local vicinity. For example, a tile store may seek to attract customers within a twenty mile radius while a shoe repair store may be geographically limited to attract customers within a two mile radius. By providing an advertiser with area codes and exchange codes from which to select to communicate advertisements to telephones having packet-based network access, advertisers may specifically target desired audiences. In one embodiment, an advertiser may elect to advertise to telephones within one or more entire area codes.

With regard to FIG. 2A, a conventional time division multiplex (TDM) telecommunications system 200 is shown. The telecommunications system 200 includes a public switched telephone network (PSTN) 202 over which telephone calls may be placed. In addition, a packet or packet-based network 204 may provide for data to be communicated between users. In one embodiment, the packet network 204 is the Internet. As shown, a telephone 206 may be in communication with the PSTN 202 and packet network 204, where the telephone 206 communicates telephone calls via the PSTN 202 and data via the packet network 204. In one embodiment, the telephone 206 is configured to enable a user to access Internet data, such as websites, and display the data on an electronic display 208. The telephone 206 is assigned an NPA-NXX by a telecommunications service provider. The NPA-NXX is generally located within a geographic region in which other customers of the telecommunications service provider services. The customers of the telecommunications service provider that are assigned the NPA-NXX are likely to be within a proximate distance (e.g., within a few miles) from one another.

In operation, the telephone 206 may communicate data packets 209 in placing a telephone call via the PSTN 202. The data packets 209 are routed to a telecommunications switch 210, which, in response, routes the telephone call to another telephone to which the user of telephone 206 has dialed. In accessing data, such as a website, on the packet network 204, the telephone 206 may communicate data packets 212 via the packet network 204.

In accordance with the principles of the present invention, an advertiser 214 may desire to advertise advertising content, such as text, audio, or images, to telephones having packet-based network access. In one embodiment, the advertiser 214 may access a network server 216 hosted by a telecommunications service provider or application service provider (ASP), for example. The network server 216 may provide an application that enables the advertiser 214 to target telephones within a particular geographic region defined by NPA-NXX codes. The network server 216 may enable the advertiser 214 to upload advertising content into a storage unit 218 for distribution to the telephone 206 during times that a user is using the telephone 206 to place calls or access the packet network 204. It should be understood that advertisements may be delivered to the telephone 206 for display on the electronic display 208 during other periods of time, but other periods of time may be less desirable due to viewing of the advertisement during those other times being less likely.

With regard to FIG. 2B, a telecommunications network that provides for VoIP telecommunications services are provided. The VoIP telecommunications provides for VoIP telephones, such as telephone 222 to provide for both VoIP and data communications using data-packet communications, such as Internet protocol data packets. It should be understood that alternative data packet communications protocols may be utilized in accordance with the principals of the present invention. As shown, both telephone calls and advertisements may be communicated to the telephone 222 from packet network 224. In the configuration of the system 220, the telephone 222, in placing a call, contacts a VoIP telecommunications switch 226 for routing of the telephone call using data-packets 228. An advertiser 230 may target telephones in geographic areas as defined by NPA-NXX, in the same or analogous manner as described with regard to FIG. 2A. Network server 232 may be utilized to enable the advertiser to select geographic areas for advertisers to target advertisements and identify calls being placed to the selected geographic areas so as to communicate advertisements to telephones that place calls to the selected geographic areas. Storage unit 234 may store one or more data repository with advertising content and selection data from advertisers to provide for the advertising functionality in accordance with the principles of the present invention.

With regard to FIG. 3, a server 300 may be utilized to provide for targeted advertising in accordance with the principles of the present invention. The server 300 may include a processing unit 302 that execute software 304. The processing unit 302 may be in communication with memory 306, input/output (I/O) unit 308, and storage unit 310. The storage unit 310 may be configured to store data repositories 312a-312n (collectively 312). The data repositories 312 may be databases, such as relational or other configuration of databases, as understood in the art.

In operation, the software 304 may be configured to enable an advertiser to upload advertising content to be stored in data repositories 312 and identify or target potential customers by selecting NPA-NXX codes of potential customers to which to communicate the uploaded advertising content. In addition, the software 304 may be configured to identify potential customers who have telephones with packet-based network service to which the advertising content can be distributed and enable an advertiser to select demographic information of potential customers stored in the data repositories 312. The demographic information may include age, gender, annual income, or any other demographic information. It should be understood that the software 304 may be configured to enable an advertiser to select from a variety of business rules, such as selecting a range of dates and times to advertise the uploaded advertising content, to the customers in the selected NPA-NXX codes.

TABLES I and II below provide exemplary databases that may be utilized by the software 304 to enable advertisers to reach a desired target audience. TABLE I provides for NPA-NXX codes assigned to customers and further provides for telecommunications services provided to each customer by a telecommunications services provider. The software 304 may utilize the data shown in TABLE I to identify customers who have Internet access (i.e., packet-based network access) via their telephones capable of receiving advertising content. In one embodiment, TABLE I may also include types of telecommunications protocols (e.g., Wi-Fi, VoIP) that each respective customer telephone is capable of receiving. In addition, the types of telecommunications protocols may also provide for bandwidth of the telecommunications protocol (e.g., 1.3 MB, 56K).

TABLE II is an illustrative database that stores demographic information of the customers listed in TABLE I. The demographic information may include age, gender, income, property ownership status, whether the customer has children, and whether the customer is married. It should be understood that additional and/or alternative demographic information may be stored and utilized by advertisers in reaching potential customers.

advertising in accordance with the principles of the present invention. The GUI 400 may enable an advertiser to enter information to provide for advertising content to be distributed to a targeted audience utilizing telephones having packet network access. The GUI 400 may include an advertiser section 402 that enables an advertiser to enter contact information, including name, address, and telephone number. An ad content section 404 may enable the advertiser to upload ad content to be used for distribution to potential customers. As shown, the ad content types that may be uploaded may include photographs, audio, and video digital data files. In uploading the ad content, the advertiser may select any of "browse" buttons 406a-406c and locate the ad content that the advertiser desires to be communicated to a telephone via a packet network. A billing information section 408 may be utilized by the advertiser to pay for advertisements communicated to potential customers.

An ad target area 410 may provide area codes, exchange codes, and a total number of data phones, for example, that are available in each respective exchange code. As shown, the area codes shown are (214) and (469). Associated with each of the area codes are a list of exchange codes in each respective area code that are serviced by a telecommunications service provider. As is understood in the art, each telecommunications service provider that provides service in an area code may have different and overlapping exchange codes. As shown, the exchange codes within the area code (214) include: 247, 259, 327, 405, 524, 526, 528, and 826. In addition, a total number of data phones available in each of the respective exchange codes are shown. For example, in NPA-NXX (214)-259, there are 615 data phones that have packet network access. An advertiser may select at least one graphical user element 412a-412n (collectively 412) associated with respective area codes and graphical user elements 414a-414n (collectively 414) associated with respective exchange codes. The graphical user elements 412 and 414 may be checked boxes, radio buttons, or any other graphical user element that enables a user to select an item. As an advertiser

TABLE I

Customer Services Database

| | | | | | | | | Telecom Services | |
|---|---|---|---|---|---|---|---|---|---|
| NPA | NXX | Cust. ID | Cust. Name | Addr. | City | St. | Zip | Voice | Internet |
| 214 | 247 | 1234 | Bob Smith | 3434 Main St. | Dallas | TX | 75201 | Yes | No |
| 214 | 247 | 2345 | Susan Smith | 2843 Flores Dr. | Dallas | TX | 75201 | Yes | Yes |
| ... | ... | ... | ... | ... | ... | ... | ... | ... | ... |
| 214 | 259 | 0001 | Steve Jones | 714 Vickery Blvd | Dallas | TX | 75206 | No | Yes |
| 214 | 259 | 8347 | Tammy Jones | 832 Miller Ave | Dallas | TX | 75206 | Yes | Yes |

TABLE II

Customer Demographics Database

| Cust. ID | Cust. Name | Age | Gender | Income | Own/Rent | Children | Married |
|---|---|---|---|---|---|---|---|
| 1234 | Bob Smith | 34 | M | $60K | Own | Yes | Yes |
| 2345 | Susan Smith | 42 | F | $75K | Own | Yes | Yes |
| ... | ... | ... | ... | ... | ... | ... | ... |
| 0001 | Steve Jones | 23 | M | $200K | Rent | No | No |
| 8347 | Tammy Jones | 27 | F | $50K | Rent | Yes | No |

Figure 4A:
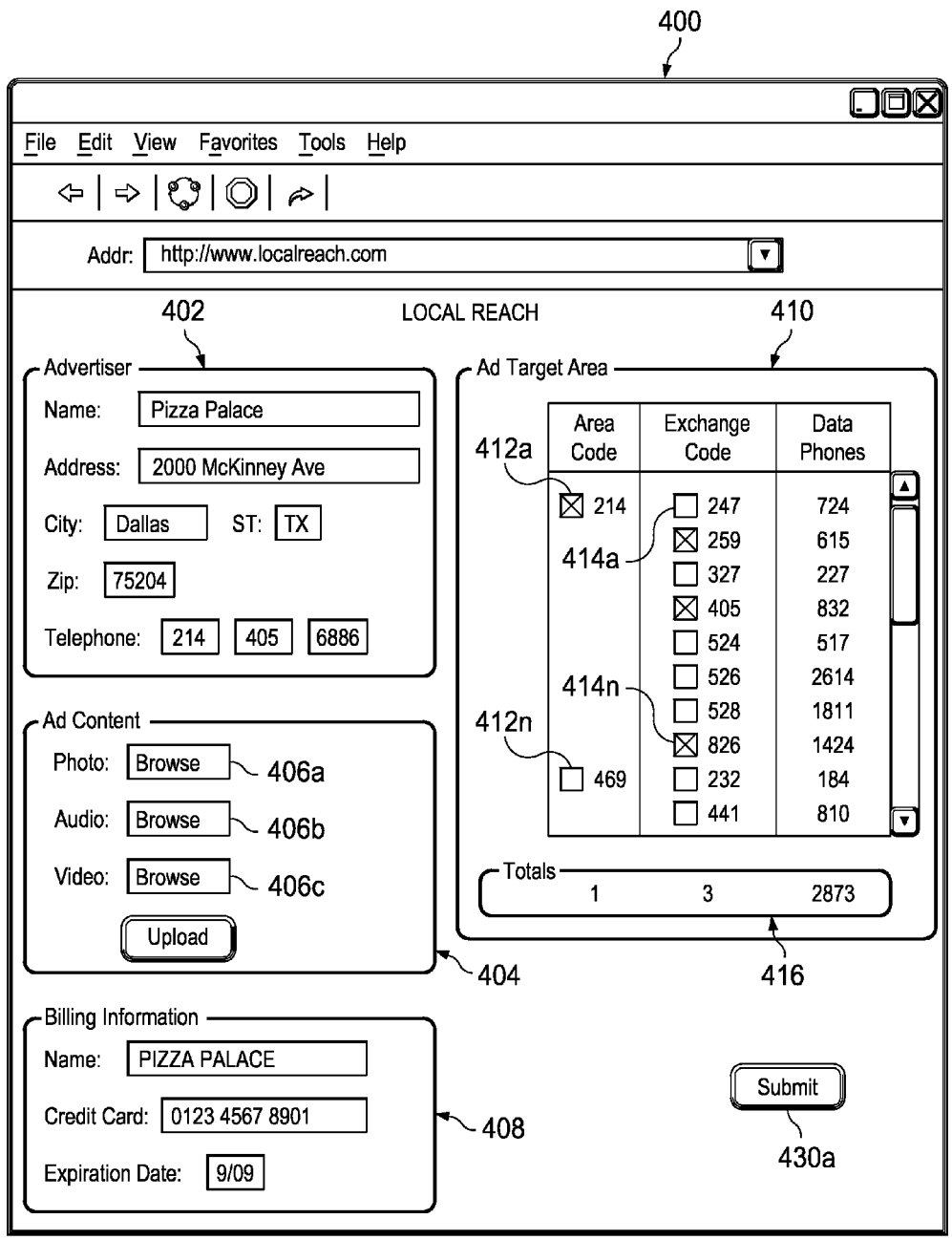
FIGS. 4A, 4B, and 4C are screen shots of illustrative graphical user interfaces to provide an advertiser with advertising capabilities in accordance with the principles of the present invention.

With regard to FIG. 4A, a graphical user interface (GUI) 400 may be provided by a telecommunications service provider or other application service provider in providing for selects the graphical user element 412 and 414, a totals section 416 may interactively change to notify a user how many area codes and exchange codes have been selected and how many data phones (i.e., telephones with packet-based network access) are in each of the selected area codes and exchange codes. In one embodiment, if a user selects an area code without selecting any exchange codes, all of the exchange codes may be considered selected, such that the ad content may be distributed to each of the telephones having packet-based network access. As shown, area code (214) has been selected and exchange codes 259, 405, and 826 have also been selected, thereby resulting in 2,873 telephones being available for distributing the ad content.

Figure 4B:
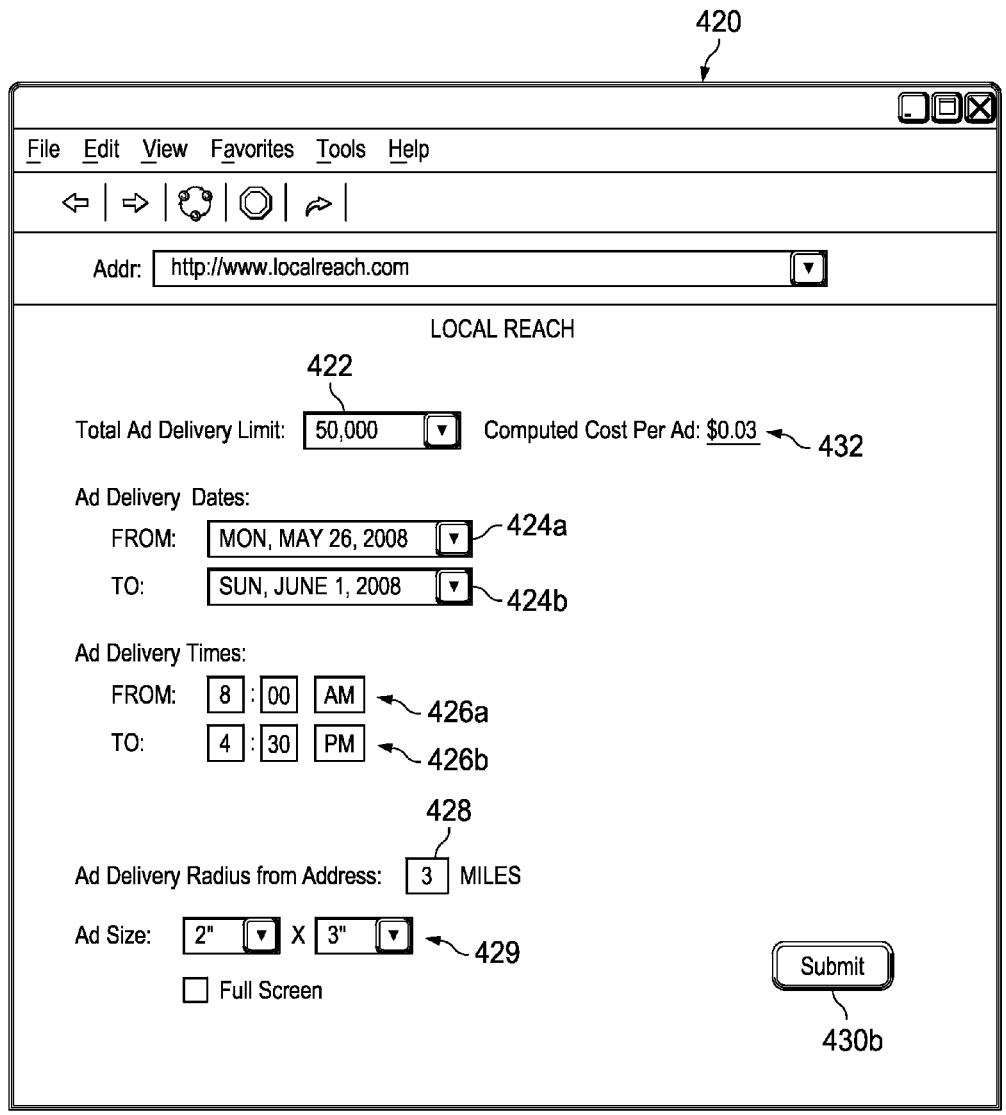

With respect to FIG. 4B, a GUI 420 is displayed. The GUI 420 provides for an advertiser to select parameters for ad content distribution to telephones having packet-based network access. A total ad delivery limit may be entered into an entry field 422, which may enable a user to select one of a number of different limits. The total ad delivery limit is representative of a total number of advertisement communications to be delivered to telephones during ad delivery dates specified in data fields 424a and 424b and between ad delivery times specified in data fields 426a and 426b during each of the ad delivery dates. If a total number of ads delivered to customers during the time period specified reaches the total ad delivery limit, then the ads will stop being delivered.

An ad delivery radius from an address specified by the advertiser may also be provided in a data field 428, where ads may be limited to addresses having a maximum distance specified by the ad delivery radius. The ad delivery radius may, in one embodiment, not be specified, thereby allowing the NPA-NXX selections in FIG. 4A establish geographic areas to which the ad content is to be delivered as opposed to a more stringent geographic area requirement set by the ad delivery radius. In determining customers that are within the ad delivery radius, a database that includes addresses of each customer may be utilized to identify customers within a specified ad delivery radius and that are within the area codes and exchange codes specified by the advertiser for ad content to be delivered.

An ad size may be selected for display of ad content by selecting the ad size in size selection fields 429. The size selection fields may include pre-established sizes, such as 1"×1", 2"×2", 2"×3", or any other size. Alternatively, the advertiser may select to display the ad as a full screen advertisement. As understood in the art, the difference in the sizes may alter cost of the advertisement.

Upon completion of entering information in the graphical user interfaces 400 and 420, a user may select submit buttons 430a and 430b, respectively. After the ad target area and total ad delivery limit have been entered, a computed cost per ad 432 may be displayed for the advertiser. It should be understood that the ad delivery dates, delivery times, and other information provided in the GUIs 400 and 420 are exemplary and that additional detail and specificity may enable a user to select where, when, how often, and other options for ad content to be delivered to customers of a telecommunications service provider.

Figure 4C:
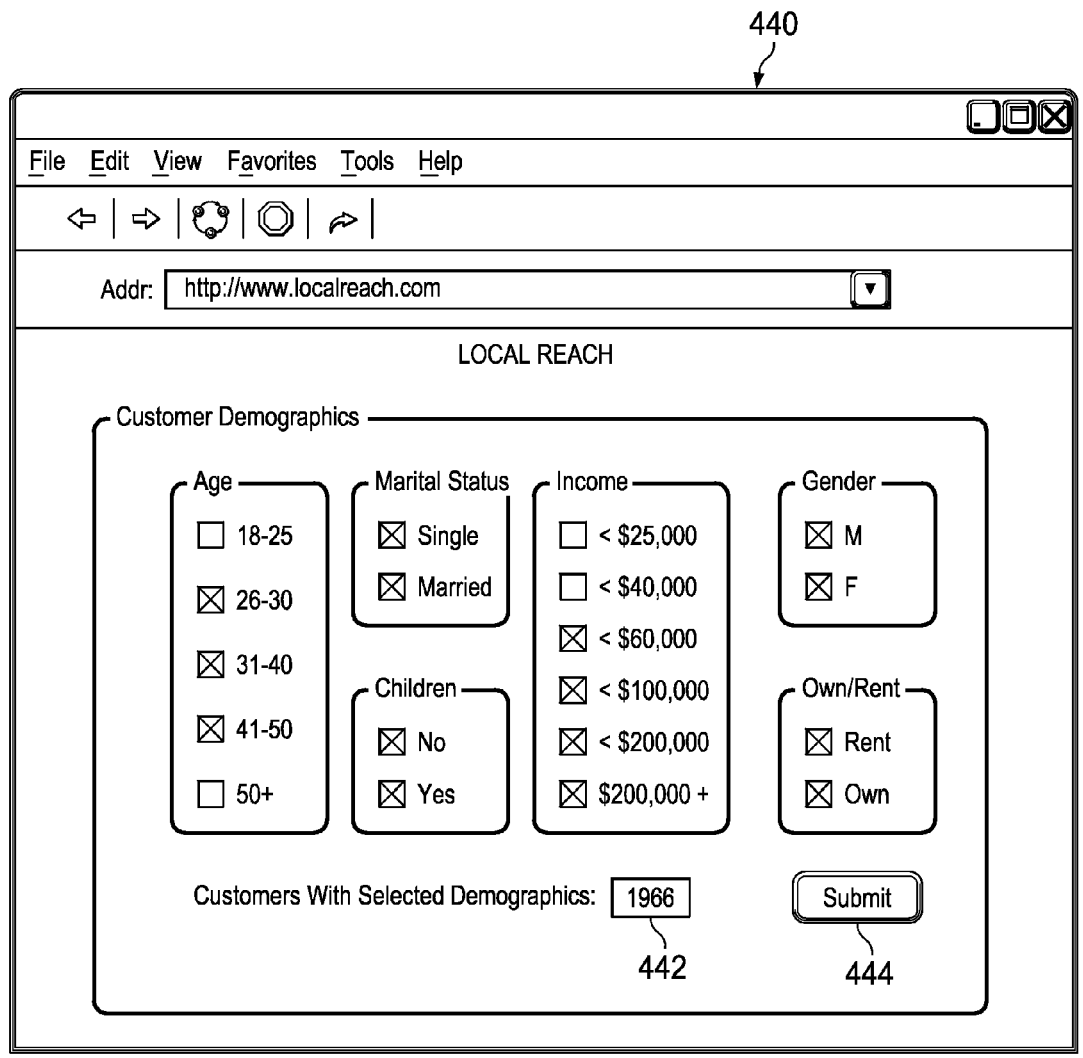

With regard to FIG. 4C, an illustrative GUI 440 may be presented to an advertiser for selection of demographics of customers with which advertising content is to be sent. The customer demographics may include age, gender, marital status, children, income, and whether the customer owns or rents. The advertiser may select one or more category in each of the available demographics for the advertising content to be sent. The GUI 440 may be interactive in that a total number of customers with selected demographics as selected may be displayed in a data field 442. The customers with selected demographics is lower than the total data phones provided in FIG. 4A unless no demographics are selected, whereupon the two values are equal. In an alternative embodiment, a total number of individuals in a household, including spouses and children, may be accounted for and displayed in a "potential viewership" data field (not shown). Upon an advertiser's completion of the customer demographics selection in GUI 440, the advertiser may select a "submit" soft-button 444 to submit the advertising order for ad content distribution, as specified in FIGS. 4A-4C.

With regard to FIG. 5, modules 500 may be utilized by server 300 of FIG. 3 to provide for advertisement delivery services in accordance with the principles of the present invention. In one embodiment, the modules 500 are software modules operating in the software 304 being executed by the processing unit 302 of FIG. 3. The modules 500 may include a display GUI module 502 that is configured to display an interactive GUI, such as GUI 400 of FIG. 4A, that enables a user to enter information that defines geographic areas in association with area codes and exchange codes, as provided in FIGS. 4A and 4B.

A determine local NPA-NXX module 504 may be configured to determine local NPA-NXX codes based on an address and/or telephone number of an advertiser. In determining the local NPA-NXX codes, a determination is made as to the location of the advertiser and then local NPA-NXX codes are determined. For example, all NPA-NXX codes that overlap the location of the advertiser may be determined. In addition, all adjacent NPA-NXX codes to the NPA (or NPA-NXX) code may be determined.

An upload ad content module 506 may be configured to enable an advertiser to select and upload ad content. The upload ad content module 506 may enable a user to upload various types of ad content, including text, images (e.g., HTML, XML, or video), and sound (e.g., wave files). The ad content may be uploaded to a data repository operating on or accessible via a network, such as the Internet.

A schedule ad delivery module 508 may be configured to enable an advertiser to schedule advertisements for delivery to potential customers. In scheduling the advertisements for delivery, the module 508 may enable a user to enter dates, days, and times throughout each of the selected days for the advertisements to be communicated to the potential customers. In one embodiment, the schedule ad delivery module 508 may enable an advertiser to select whether the advertisements are to be delivered at the beginning of a telephone call, during a telephone call, at the end of a telephone call, or during times that a user is not currently using the telephone. Accordingly, rates of advertising may vary based on dates, days, times, or other delivery time parameters as understood in the art. For example, high data traffic times for delivery of ad content, especially video content, may be more expensive during business hours than non-business hours.

A compute ad delivery rate module 510 may be configured to determine ad delivery rates for advertising content to be delivered to potential customers based on schedules that the advertiser selects utilizing the schedule ad delivery module 508. As previously described, ad delivery rates may vary based on dates, days, times, and any other factor (e.g., prior to, during, after, or in absence of a telephone call being placed). The compute ad delivery rate module 510 may be utilized to display a rate per individual ad, rate per thousand ads delivered, or any other cost or rate associated with delivery a particular advertisement. In one embodiment, the ad delivery rate may vary based on the amount of content and/or type of content being delivered to telephones with packet-based network access. For example, a photograph may have a lower rate than video because video has higher content and bandwidth needs than does a photograph.

A collect advertiser ad parameters module 512 may be configured to collect advertiser parameters from an advertiser for delivery limitations. For example, the ad parameters may have a maximum number of advertisement deliveries (e.g., 50,000) that a particular advertisement is to be delivered over a given time period. In another example, an ad parameter may be a minimum number of advertisements to be delivered during a given time period. Still yet, the ad parameters may include NPA-NXX codes to which the advertisements are to be delivered. Furthermore, an ad delivery radius within which advertisements are to be delivered from an advertiser may be specified such that the advertising content is to be delivered to potential customers having a maximum distance from an advertiser of a specific distance (e.g., three miles).

An identify customers with selected demographics module 513 may be configured to identify customers in a database of customers of a telecommunications service provider that are within demographics selected by an advertiser. The demographics available for selection may be the same or different from the demographics available for selection in FIG. 4C and stored in TABLE II. The module 513 may count a total number of customers within the selected demographics while the advertiser is selecting the demographics in the GUI 440 of FIG. 4C.

A determine customer distance from advertiser module 514 may be utilized to determine potential customer distances from a physical location of an advertiser. The module 514 may utilize addresses of potential customers in determining the distance of the potential customers from the physical location of the advertiser. However, if the advertiser does not specify an ad delivery radius, then the system relies on NPA-NXX code selection in determining which potential customers to deliver the ad content.

A change ad order module 516 may be utilized to enable an advertiser to change an advertisement delivery order after submitting the initial ad delivery order. The change ad order module 516 may enable the advertiser to change area codes, exchange codes, total ad delivery, minimum advertisement deliveries, delivery times, delivery dates, or any other parameter associated with the original or modified ad order.

A deliver ad module 518 may be configured to establish a "playlist" schedule for ad delivery based on the ad order established by an advertiser. In one embodiment, the deliver ad module 518 may access a database or data repository to preload ad content into memory of a computing device for faster delivery. In addition, the deliver ad module 518 may communicate the ad content to local access points that communicate with the telephones of the potential customers prior to delivery times to minimize network traffic. Still yet, the deliver ad module 518 may establish a playlist on telephones of potential customers, thereby minimizing download time during a telephone call to maximize ad deliveries during any particular telephone call.

Figure 6A:
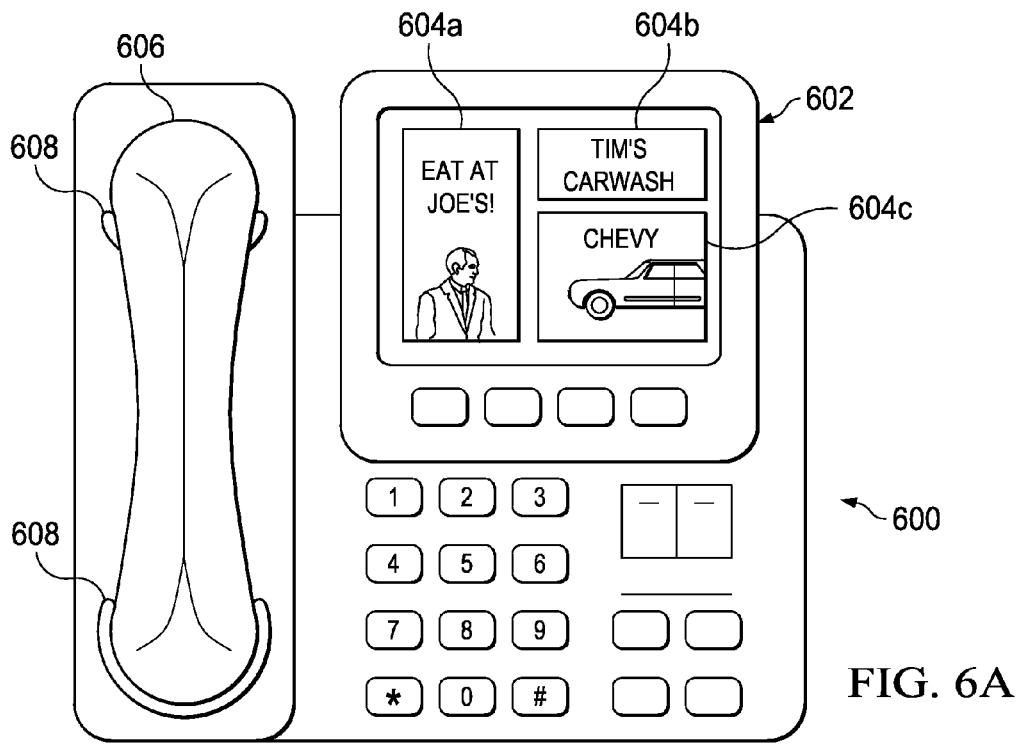
FIG. 6A is an illustration of an illustrative telephone with an electronic display configured to display advertisements.

With regarding to FIG. 6A, a telephone 600 may include an electronic display 602 that may display one or more advertisements 604a-604c (collectively 604) during a telephone call when a handset 606 is off-hook (i.e., when a user has taken the handset 606 off of a cradle 608 that maintains position of the handset 606 while the telephone is not in use). The displayed advertisements 604 may be simultaneously displayed on the electronic display 602 and sized in accordance with an advertiser's desire. It should be understood that alternative configurations of the advertisements 604 may be utilized in accordance with the principles of the present invention. For example, rather than including multiple advertisements on the electronic display 602 during a telephone call or during other times, a single advertisement may be displayed that covers the entire electronic display 602. In one embodiment, a user viewing the advertisements 604 may have the ability to interactively select an advertisement being displayed to receive additional content, such as specifications of a particular Chevy automobile. As previously described, the advertisements may be displayed during a telephone call when it is expected that a potential customer is able to view the advertisements being displayed or displayed during times of non-use of the telephone 600, which may defined by the handset 606 being on-hook.

Figure 6B:
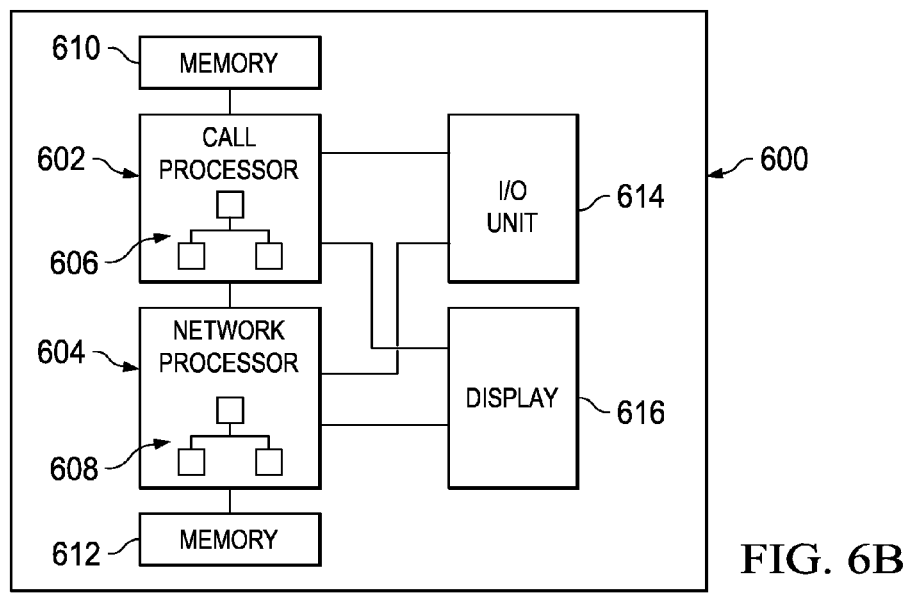
FIG. 6B is a block diagram of components with the telephone of FIG. 6A configured to provide for displaying advertisements in accordance with the principles of the present invention.

With regard to FIG. 6B, the telephone 600 may include a call processor 602 and a network processor 604. The call processor 602 may execute software 606, which is configured to handle incoming and outgoing telephone calls along with other conventional telephone functionality. The network processor 604 executes software 608 that is configured to communicate data over a packet network, such as the Internet, to provide data communications, including receiving advertisements from advertisers. The call processor 602 may be in communication with a memory 610, and the network processor 604 may be in communication with memory 612. As exemplified by the memories 610 and 612, the memory for the call processor 602 is smaller than the memory for the network processor 604 as the memory 612 may be utilized to store significantly larger amounts of information to enable a user to access the packet-based network and store advertisements for display on the telephone 600.

An I/O unit 614 may be configured to communicate via a telecommunications network and/or packet-based network, which, in one embodiment, may be the same. It should be understood that the I/O unit 614 may include one or more input/output devices that communicate using one or more different communications protocols, as understood in the art.

An electronic display 616 may be in communication with both the call processor 602 and network processor 608 for display of information associated with both telephone calls and network communications. For example, in response to a telephone call being received or placed at the telephone 600 by a user, the call processor 602 may display information associated with the telephone call, including telephone number dialed, caller ID, time of telephone call, current local time, or any other information associated with a telephone call. The network processor 604 may be configured by the software 608 to display advertisements delivered from a service provider to the telephone 600 prior to, at the beginning of during, or after a telephone call (i.e., when the telephone is on-hook and off-hook). As shown, the call processor 602 may be in communication with the network processor 604 such that the network processor 604 may be configured to receive notice that the telephone 600 has gone off-hook and that an advertisement scheduled for display on that date and during the current time is to be displayed on the electronic display 616. In one embodiment, the call processor 602 and network processor 604 may be configured as a single processor and the functionality in the software 606 and 608 may operate on a single processor. It should be further understood that the network processor 604 may be configured as one or more processors that operate to perform network communication and ad display, respectively.

With regard to FIG. 7, an exemplary playlist 700 is shown. The playlist 700 may be managed on a telephone, such as telephone 600 in FIGS. 6A and 6B, on a network element, such as a server on which the advertising content is stored, or at local access points to which telephones may communicate to access a packet network. The playlist 700 includes data records 702a-702n (collectively 702) to identify each individual ad content available to be displayed at the current date and time. As shown, each data record 702 may include dates, days, hours, ad content, type, length, size, position, on-hook, off-hook, and played information. The dates, days, and hours information are used to determine that an advertisement may be played at the current time depending on the on-hood and off-hook information. As shown, ad content "chevycar.mpeg" indicates that the ad content is a video and has a length of 18 seconds with a size of 2"×3" for a position in the center of the display on the telephone. As further specified, the ad content is only to be displayed when the telephone is off-hook (i.e., when a user is actually using the telephone).

As indicated by the "played" information, the ad content has been played 2.5 times, which indicates that the ad content may have been played during a telephone call and only approximately 9 seconds of the advertisement was played during one of the telephone calls. It should be understood that additional requirements for displaying the ad may be stored in the playlist 700 as managed by a playlist manager, where the playlist may be stored on a telephone for selecting and playing each advertisement at the pre-established date, time, and location on the display on the telephone. For example, data may be stored in the playlist 700 that indicates that an advertisement is to be displayed at the beginning of a telephone call, any time during a telephone call, or just after the telephone goes back on-hook. This ad scheduling information may be used to distinguish between pricing options for advertisers in displaying the ads on the telephones. Software executing on the telephone (e.g., software 608 on telephone 600 of FIG. 6B) may utilize business rules that are controlled by parameters stored in the playlist 700. The played information (e.g., number of times an ad is displayed) may be uploaded or collected by a server on a packet network to determine billings to advertisers for display of the advertisements. It should be understood that the played information, which records the number of times that ad content is played on a telephone, may be collected by the telephone or, in a configuration in which ad content is delivered remotely on a real-time basis, the played information may be collected at a network server that is delivering the ad content. However, to maximize the number of ads that may be displayed during a telephone call, the ad content may be stored on the telephone for more immediate display in response to the telephone going off-hook. Other ad display information may be collected and uploaded to a central server on a network to a telecommunications service provider. For example, date, day, and times of day that an ad is displayed may be collected to ensure the ad was displayed during times specified by an advertiser.

With regard to FIG. 8, an illustrative process 800 is shown between a network server 802 and telephone with network access 804. At step 806, the network server 802 may determine telephones to send ad content. The determination may be based on submission of ad display information or ad scheduling information provided by an advertiser. At step 808, ad content may be communicated to the telephone 804. The communication of the ad content may be performed during off-peak times to lower cost of delivery of the ad content. At step 810, the telephone 804 may set the ad content in a play list. In setting the ad content in the play list, ad play times and other information that may be used by a play list manager operating on the telephone as described with respect to FIG. 7. At step 812, the telephone may play the add content and count the number of plays of the ad content. At step 814, the ad play count may be communicated from the telephone 804 to the network server 802 for use in tracking the number of times that the ad content has been played. It should be understood that a total ad play count may count the total number of times an advertisement is displayed on all of the telephones on which the ad content was communicated. At step 816, the network server 802 may bill the advertiser of the ad content based on a number of factors, including dates of play, times of play, total number of times the ad content was displayed, etc.

Figure 9:
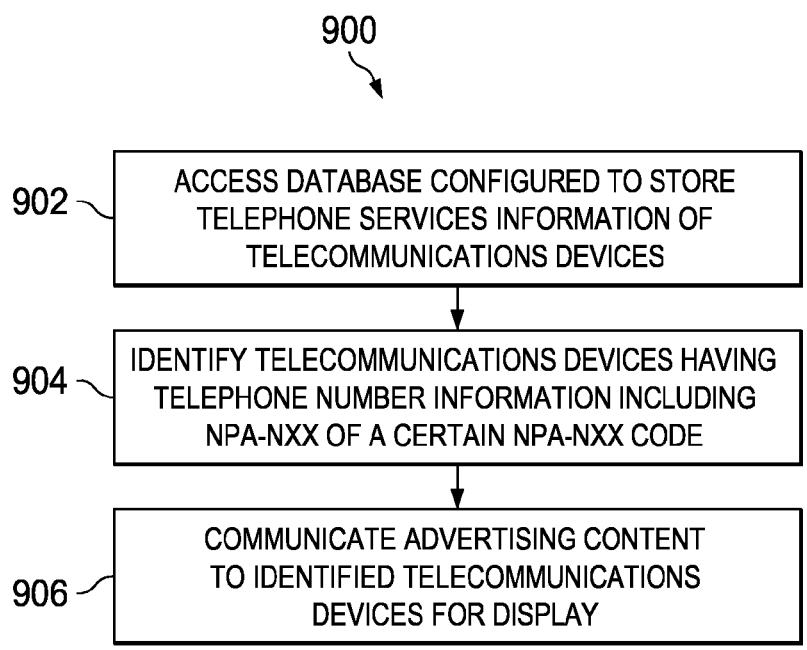
FIG. 9 is a flow diagram of an illustrative process for providing advertising to telephones with packet-based network access.

With regard to FIG. 9, an illustrative process 900 that provides for advertising to telephones with packet-based network access is provided. The process 900 may start at step 902, where a database configured to store telephone services information of telecommunications device is accessed. The telecommunications services information may indicate whether a telecommunications device has packet-based network access. The database may be utilized to track telecommunications services provided to customers of a telecommunications service provider. The telephone service information may include information associated with home telephone and non-home telephone services (e.g., office, wireless devices, etc.). At step 904, telecommunications devices having telephone number information including NPA-NXX of a certain NPA-NXX code may be identified. One or more NPA-NXX codes may be identified in response to an advertiser selecting to advertise to potential customers located in geographic regions with particular NPA-NXX codes. In one embodiment, if an advertiser selects an NPA code or area code, then each of the NXX codes or exchange codes within the NPA. At step 906, advertising content may be communicated to identified telecommunications devices for display. The advertising content may be text, photographs, graphics, video, or any combination thereof.

The previous detailed description is of a small number of embodiments for implementing the invention and is not intended to be limiting in scope. The following claims set forth a number of the embodiments of the invention disclosed with greater particularity.

What is claimed is:

1. A method of delivering targeted advertising to a packet-based network telecommunications device, said method comprising:

accessing a database configured to store telephone services information concerning multiple telecommunications devices, the telecommunications services information indicating telecommunications device location information and whether the telecommunications devices have packet-based network access;

identifying a telecommunications device by the location associated with the telecommunications device and whether the telecommunications device has packet-based network access;

communicating advertising content from an advertiser to the identified telecommunications device for display on the identified telecommunications device concurrently with a telephone call connection between the identified telecommunications device and a third party telecommunications device, wherein the third party telecommunications device is unassociated with the advertiser and wherein the advertising content is stored in memory associated with the identified telecommunications device and the advertising content is displayed at least once during a subsequent telephone call;

determining an approximate distance from the location associated with the telecommunications device to the advertiser;

identifying a second telecommunications device within the determined distance from the advertiser; and communicating the advertising content to the identified second telecommunications device.

2. The method according to claim 1, further comprising:

determining from the telecommunications services information a type of telecommunications protocol that the identified telecommunications device uses for network access; and wherein communicating the advertising content to the identified telecommunications device includes communicating the advertising content using the determined type of telecommunications protocol.

3. The method according to claim 1, wherein identifying the telecommunications device further comprises identifying the telecommunications device as having telecommunications services information indicative of home telephone service.

4. The method according to claim 1 wherein identifying the telecommunications device by location comprises identifying a NPA-NXX code associated with the telecommunications device.

5. The method according to claim 4, further comprising:
determining a NPA-NXX code that geographically neighbors the NPA-NXX code associated with the identified telecommunications device;
identifying a second telecommunications device having telephone number information including the geographically neighboring NPA-NXX code; and
communicating advertising content to the identified second telecommunications devices.

6. The method according to claim 1, further comprising providing a user interface to enable an advertiser to submit the advertising content and to select the location associated with the identified telecommunications device.

7. The method according to claim 1, further comprising:
determining a demographic criteria of a user associated with the identified telecommunications device; and
communicating the advertising content to a second telecommunications device associated with a second user who is determined to correspond to the demographic criteria.

8. The method according to claim 1, further comprising limiting communicating advertising content to a predetermined number of telecommunications devices.

9. A system of delivering targeted advertising to packet-based network telecommunications devices, said system comprising:
a database configured to store telephone services information of multiple telecommunications devices, the telecommunications services information indicating telecommunications device location information and whether the telecommunications devices have packet-based network access;
a processing unit in communication with said database and configured to:
identify a telecommunications device by the location associated with the telecommunications device and whether the telecommunications device has packet-based network access;
communicate advertising content from an advertiser to the identified telecommunications device for display on the identified telecommunications device concurrently with a telephone call connection between the identified telecommunications device and a third party telecommunications device, wherein the third party telecommunications device is unassociated with the advertiser, and wherein the advertising content is stored in memory associated with the identified telecommunications device and the advertising content is displayed at least once during a subsequent telephone call;
determine an approximate distance from the location associated with the telecommunications device to an advertiser;
identify a second telecommunications device within the determined distance from the advertiser; and
communicate the advertising content to the identified second telecommunications device.

10. The system according to claim 9, wherein said processing unit is further configured to:
determine from the telecommunications services information a type of telecommunications protocol that an identified telecommunications device uses for network access; and
communicate the advertising content using the determined type of telecommunications protocol.

11. The system according to claim 9, wherein said processing unit is further configured to identify the telecommunications device as having telecommunications services information indicative of home telephone service.

12. The method according to claim 9, wherein said processing unit is configured to identify the telecommunications device location by identifying a NPA-NXX code associated with the telecommunications device.

13. The system according to claim 12, wherein said processing unit is further configured to:
determine a NPA-NXX code that geographically neighbors the NPA-NXX code associated with the identified telecommunications device;
identify a second telecommunications device having telephone number information including the geographically neighboring NPA-NXX code; and
communicate advertising content to the identified second telecommunications devices.

14. The system according to claim 9, wherein said processing unit is further configured to provide a user interface to enable an advertiser to submit the advertising content and to select the location associated with the identified telecommunications device.

15. The system according to claim 9, wherein said processing unit is further configured to:
determine a demographic criteria of a user associated with the identified telecommunications device; and
communicate the advertising content to a second telecommunications device associated with a second user who is determined to correspond to the demographic criteria.

16. The system according to claim 9, wherein said processing unit is further configured to limit communicating advertising content to a predetermined number of telecommunications devices.

* * * * *